(12) United States Patent
Knight

(10) Patent No.: US 8,957,330 B1
(45) Date of Patent: Feb. 17, 2015

(54) MODULAR REMOTE WITH TOUCHSCREEN

(76) Inventor: Omar Knight, Utica, NY (US)

( * ) Notice: Subject to any disclaimer, the term of this patent is extended or adjusted under 35 U.S.C. 154(b) by 639 days.

(21) Appl. No.: 13/197,139

(22) Filed: Aug. 3, 2011

(51) Int. Cl.
*G09G 3/34* (2006.01)

(52) U.S. Cl.
USPC ............ 178/18.01; 178/18.02; 178/18.03; 178/18.04; 178/18.05; 178/18.06; 178/18.07; 178/18.08; 178/18.09; 178/18.11; 436/37; 345/156; 345/165; 345/173; 345/174; 345/175; 345/176; 345/177; 345/178

(58) Field of Classification Search
USPC ................................. 345/156, 169, 173–178; 178/18.01–18.09, 18.11; 463/37
See application file for complete search history.

(56) References Cited

U.S. PATENT DOCUMENTS

| | | | |
|---|---|---|---|
| 4,143,417 A | 3/1979 | Wald et al. | |
| D339,137 S | 9/1993 | Takeda | |
| D352,506 S | 11/1994 | Kawamoto et al. | |
| 6,879,254 B1 | 4/2005 | Graham | |
| 2008/0307459 A1* | 12/2008 | Migos | 725/39 |
| 2010/0311489 A1* | 12/2010 | Miller et al. | 463/16 |

FOREIGN PATENT DOCUMENTS

WO       WO 0065553 A1 * 11/2000

* cited by examiner

*Primary Examiner* — Charles V Hicks
*Assistant Examiner* — Jeffrey Steinberg
(74) *Attorney, Agent, or Firm* — Crossley Patent Law

(57) ABSTRACT

A modular remote with touchscreen including a first member having a first sensor diposed on an anterior end and a first connection port disposed on a rear end; a second member having a touchscreen display disposed upon a top surface, a first connector disposed on a front side, a second sensor disposed on the front side, a second connection port disposed on a rear side; and a third member having a second connector disposed on a forward side; wherein the first connector interconnects with the first connection port and the second connector interconnects with alternately both the first connection port and the second connection port; whereby the first and third members interconnect to operatively communicate remotely with a plurality of household devices, and the second member separates from said first and third members to operatively communicate remotely with a plurality of household devices via interaction with a Graphic User Interface displayed by the touchscreen display.

6 Claims, 4 Drawing Sheets

MODULAR REMOTE WITH TOUCHSCREEN

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of remote controls are known in the prior art. However, what is needed is a modular remote with touchscreen that includes a first member having a first sensor diposed on an anterior end and a first connection port disposed on a rear end; a second member having a touchscreen display disposed upon a top surface, a first connector disposed on a front side, a second sensor disposed on the front side, a second connection port disposed on a rear side; and a third member having a second connector disposed on a forward side; wherein the first connector interconnects with the first connection port and the second connector interconnects with alternately both the first connection port and the second connection port; whereby the first and third member interconnect to operatively communicate remotely with a plurality of household devices, and the second member separates from said first and third members to also operatively communicate remotely with a plurality of household devices via interaction with a Graphic User Interface displayed by the touchscreen display.

FIELD OF THE INVENTION

The present invention relates to a remote control, and more particularly, to a modular remote with touchscreen

SUMMARY OF THE INVENTION

The general purpose of the modular remote with touchscreen, described subsequently in greater detail, is to provide a modular remote with touchscreen which has many novel features that result in a modular remote with touchscreen which is not anticipated, rendered obvious, suggested, or even implied by prior art, either alone or in combination thereof.

In the modern age a plurality of household devices are operable by means of remote control. Often, a single household employs numerous remote controls to operationally communicate remotely with various household devices. The present device, as disclosed in this specification, has been devised to operationally communicate remotely with a plurality of household devices, thereby replacing the need for numerous remote controls that otherwise may be required.

The present device is envisioned to operationally communicate remotely with such common household devices as televisions, DVD players, Video Cassette Recorders, stereos, and various other appliances which are manufactured to respond to radio and infrared signals relayed over a specific frequency range. These appliances include such items as ceiling fans, lighting fixtures, smart technology for regulating energy use in the home, and other household items not limited to entertainment.

Some such "universal remotes" are evident in the prior art, however the present device employs three inter-connectable members that function collectively as a remote control. Further, a second member may be detached from a first and a third member to operate independently as a remote control.

The first member has a keypad including an alphanumeric series, a power button, a channel control, and a volume control. The first member also includes a first sensor disposed on an anterior end. The first sensor relays infrared and alternately radio signals over a selectable frequency range, and the keypad enables specific commands to be relayed to a specific household device, when said household device is in operational communication with the instant modular remote with touchscreen.

The first member also has a first connection port disposed on a rear end. This first connector port releasably engages with alternately both of a first connector, disposed on a front side of the second member, and a second connector disposed on a forward side of the third member.

The second member has a touchscreen display disposed on a top surface. This touchscreen display enables interaction with a Graphic User Interface to select a specific household device and an associated frequency range, and operationally communicate with said household device. Further, the touchscreen display enables access to, and interaction with, data stored by the second member. Such data may include, but is not limited to, favorite channels, favorite stations, history, and other information. Further more, the present device is envisioned to be programmable by means of the Graphic User Interface. The Graphic User Interface may also enable a scanning function, whereby the specific frequency of a specific or particular device may be ascertained, and said specific or particular device operationally controlled remotely by the modular remote with touchscreen, such data then stored within the modular remote with touchscreen for future and continued use. The Graphic User Interface will also display virtual buttons and menus a person may use to perform functions required when operationally communicating remotely with each of a plurality of household devices.

The second member also has a second connection port disposed in a rear side. This second connection port releasably engages with the second connector disposed on the forward side of the third member.

The second member has a second sensor disposed on the front side. This second sensor also relays alternately both infrared and radio signals to operationally communicate remotely with a plurality of household devices. This second member may thusly be used as a separate remote control.

The third member has a plurality of buttons disposed on an upward surface. This plurality of buttons includes a Play button, a Pause button, a Rewind button, a Fast Forward button, a Stop button, a Next Section button and a Previous Section button to operationally control devices such as a DVD player, a VCR and a stereo. When the third member is interconnected with the first member, the first and third member operate as a separate remote independent of the second member. When the second member is interconnected with the first member, and the third member is interconnected with the second member, the device operates as a single remote control with all the features of the first, second, and third member united into a single operative body.

The third member has a charging piece disposed on a posterior section. This charging piece contacts a contact piece disposed in a cradle of a charging unit. Thusly, the instant device may be charged en masse, with the first, second and third members interconnected. Alternately, the first and third member may be interconnected and charged in the cradle by means of the charging piece disposed on the posterior section of the third member.

The charging unit cradle also has a charging port, into which charging port the first and second connectors may be releasably engaged such that the second member may be charged independently, and concurrently, with the third and first members.

Each of the first, second, and third members has a rechargeable battery disposed within a first, second, and third battery compartment. Each of said rechargeable batteries may be replaced, if preferred.

Thus has been broadly outlined the more important features of the present modular remote with touchscreen so that the detailed description thereof that follows may be better understood and in order that the present contribution to the art may be better appreciated.

Objects of the present modular remote with touchscreen, along with various novel features that characterize the invention are particularly pointed out in the claims forming a part of this disclosure. For better understanding of the modular remote with touchscreen, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
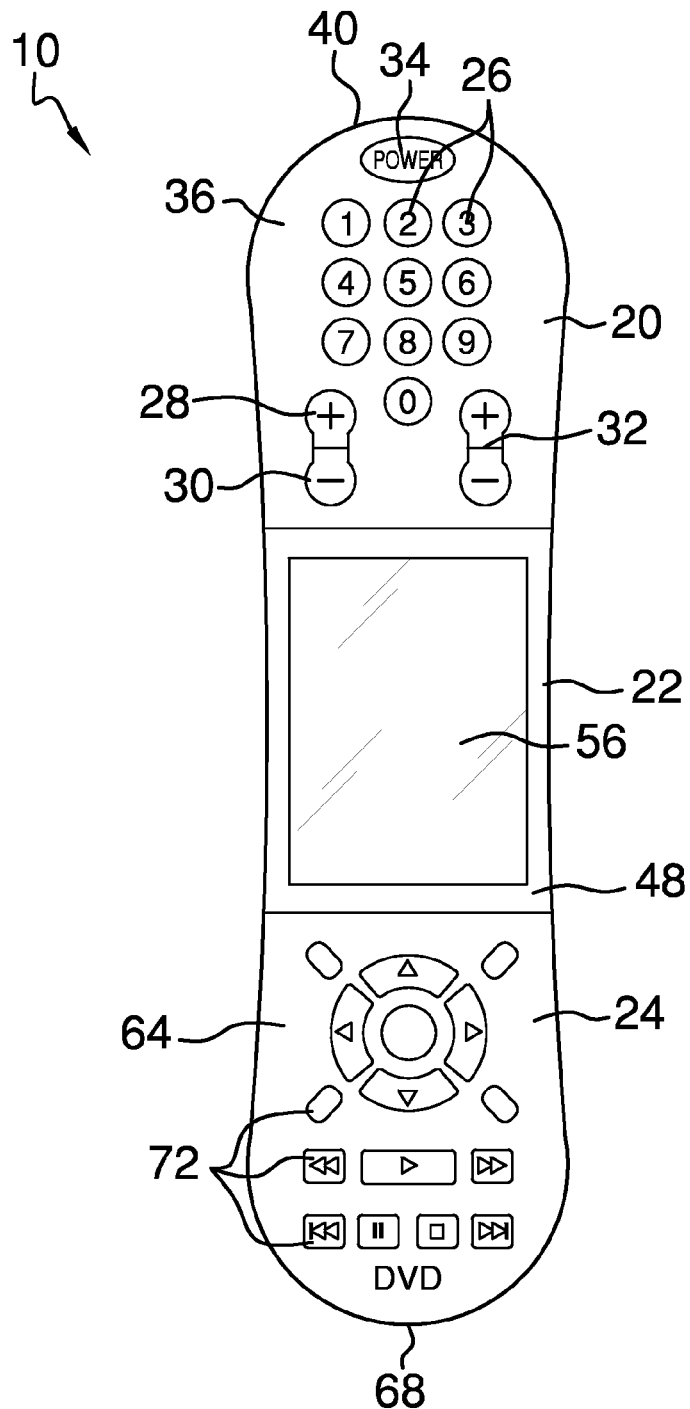
FIG. 1 is a top view.

With reference now to the drawings, and in particular FIGS. 1 through 6 thereof, example of the instant modular remote with touchscreen employing the principles and concepts of the present modular remote with touchscreen and generally designated by the reference number 10 will be described.

Referring to FIGS. 1 through 6 a preferred embodiment of the present modular remote with touchscreen 10 is illustrated.

The modular remote with touchscreen 10 includes a first member 20, a second member 22, and a third member 24. These first 20, second 22, and third 24 members are operatively inter-connectable, the second member 22 removable from between the first 22 and third 24 members to operate as a separate remote control independently, when desired, as will be detailed further in this specification.

The first member 22 includes a keypad 26, having, but not limited to, a channel up button 28, a channel down button 30, a volume control 32, and a power button 34 disposed upon a generally planar upper surface 36. The first member also has a generally planar under surface 38, a generally obround anterior end 40, and a planar rear end 42. The rear end 42 operatively interconnects with the second 22 and alternately the third 24 member by means of a first connection port 44 centrally disposed thereon (see FIGS. 2 and 5).

Figure 2:
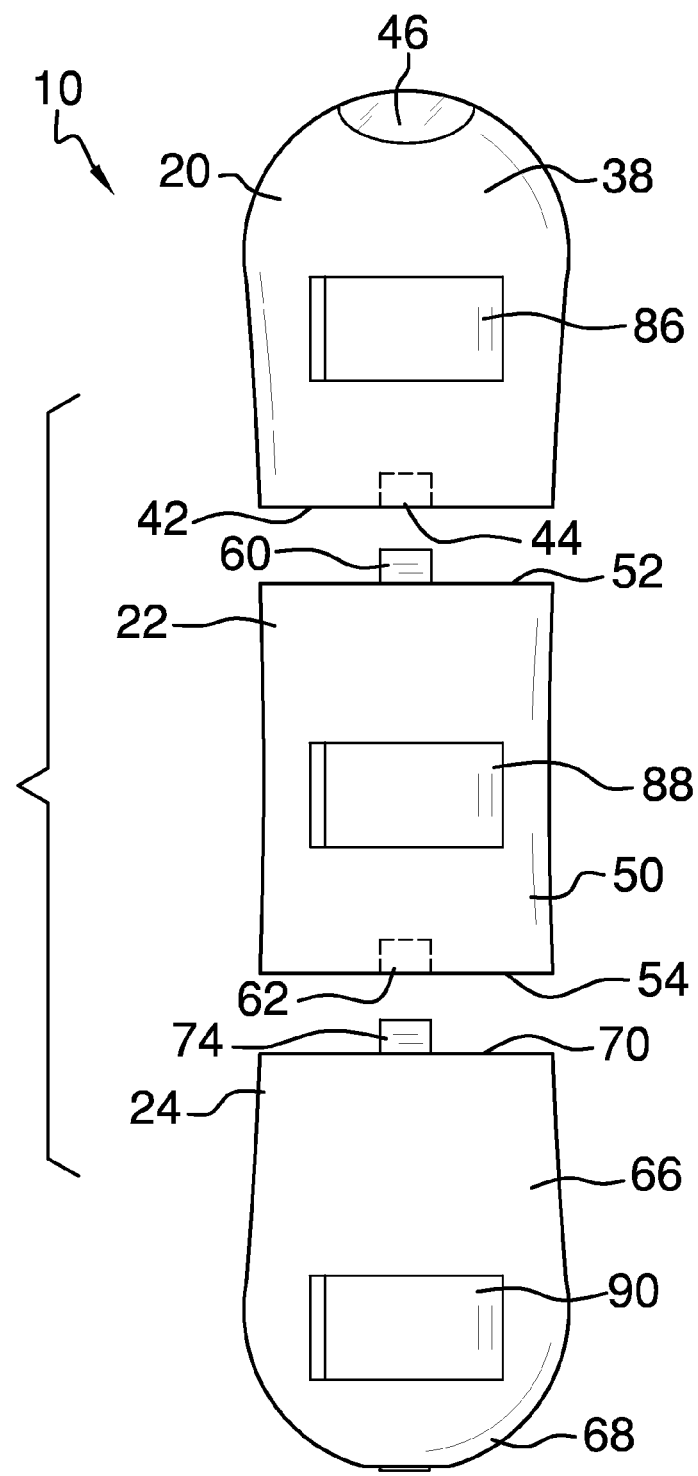
FIG. 2 is back view.
Figure 3:
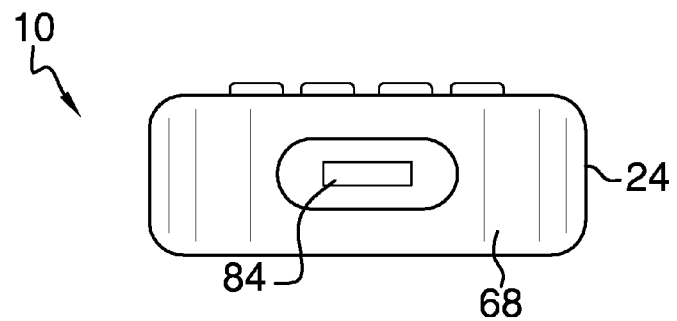
FIG. 3 is a bottom view.

A first sensor 46 is centrally disposed in the anterior end 40 of the first member 20 (as shown in FIG. 2). The first member 20 emits frequencies in the radio spectrum and alternately the infrared spectrum via the first sensor 46 to operatively communicate with a plurality of household devices (not shown).

The second member 22 includes a top surface 48, a bottom surface 50, a front side 52, and a rear side 54. A touchscreen display 56 is disposed within the top surface 48, and a second sensor 58 is disposed within the front side 52 (see FIG. 6). The second member 22 has a first connector 60 centrally disposed on the front side 52, the first connector 60 protruding forward therefrom. The second member 22 is thusly operatively interconnectable with the first member 20; the first connector 60 releasably mating with the first member 20 first connection port 44. The second member 22 also includes a second connection port 62 centrally disposed on the rear side 54 to operatively interconnect with the third member 24, as described below.

The second member 22 second sensor 58 also emits frequencies in the radio spectrum and alternately the infrared spectrum to operatively communicate with a plurality of household devices, as desired, when the second member 22 is separated from the first 20 and third 24 members. To this effect, the touchscreen display 56 includes a selectable Graphic User Interface (not shown) to operatively control the plurality of household devices.

It is envisioned that this touchscreen display 56, as well as displaying a Graphic User Interface for operatively communicating remotely with a plurality of household devices, will also enable access to data stored by the second member 22, such data including favorite television channels, radio stations, history, and other storable data.

The third member 24 includes a generally planar upward surface 64, a generally planar downward surface 66, an ergonomic posterior section 68, and a planar forward side 70. A plurality of buttons 72 is disposed upon the upward surface 64. This plurality of buttons 72 includes buttons for remotely controlling a VCR and alternately a DVD (not shown). A second connector 74 is centrally disposed protruding forward from the forward side 70. The third member 24 forward side 70 is thusly operatively connectable with both the first connection port 44, disposed in the first member 20 rear end 42, and the second connection port 62 disposed in the second member 22 rear side 54.

When interconnected, The first 20, second 22, and third 24 members operatively communicate together to control the emissions from the first sensor 46. When separated, the first member 20 may be interconnected with the third member 24 to function as a remote control, each of the plurality of buttons 72 and keypad 26 acting as an interface to operatively communicate remotely with a plurality of household devices. When separated from the first member 20, the second member 22 may be used independently from the first 20 and third 24 members, to function as a separate remote control, the touchscreen display 56 enabling interaction with the Graphic User Interface to operatively communicate remotely with the plurality of household devices.

Figure 4:
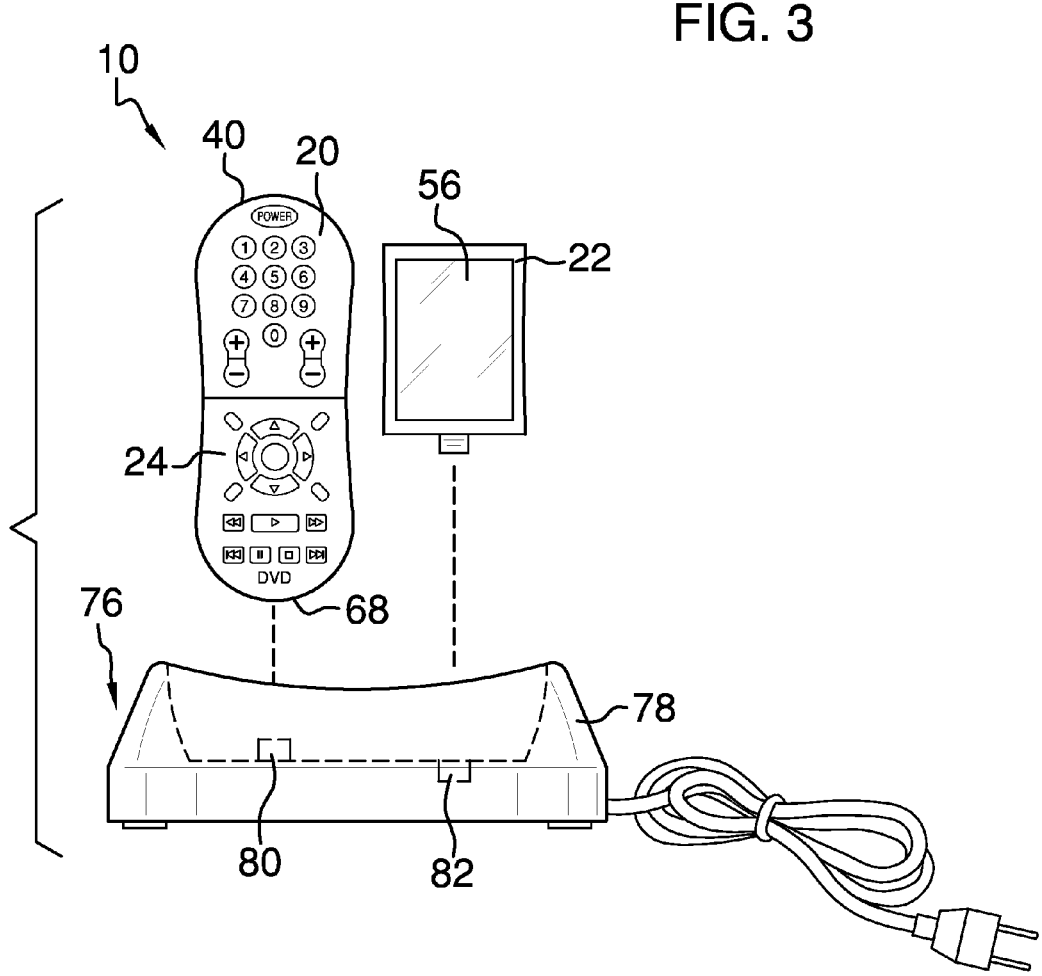
FIG. 4 is an isometric view of the device and a charging unit.
Figure 5:
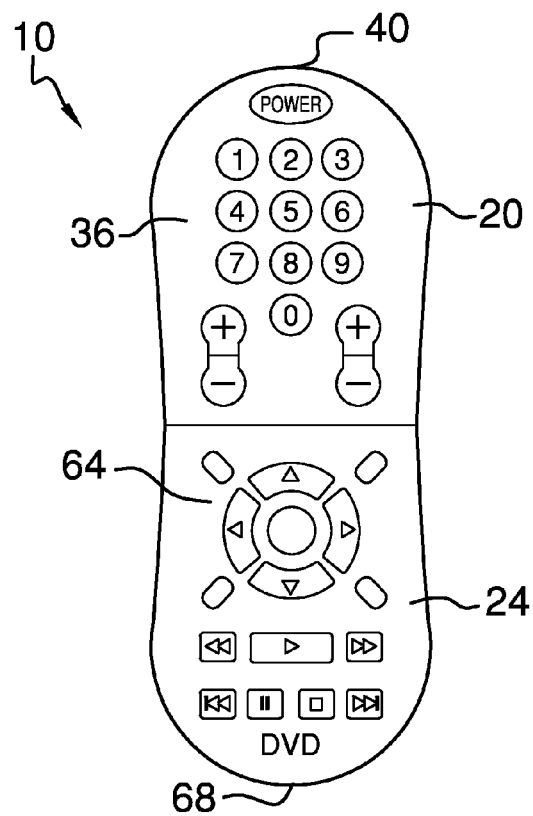
FIG. 5 is detail view.
Figure 6:
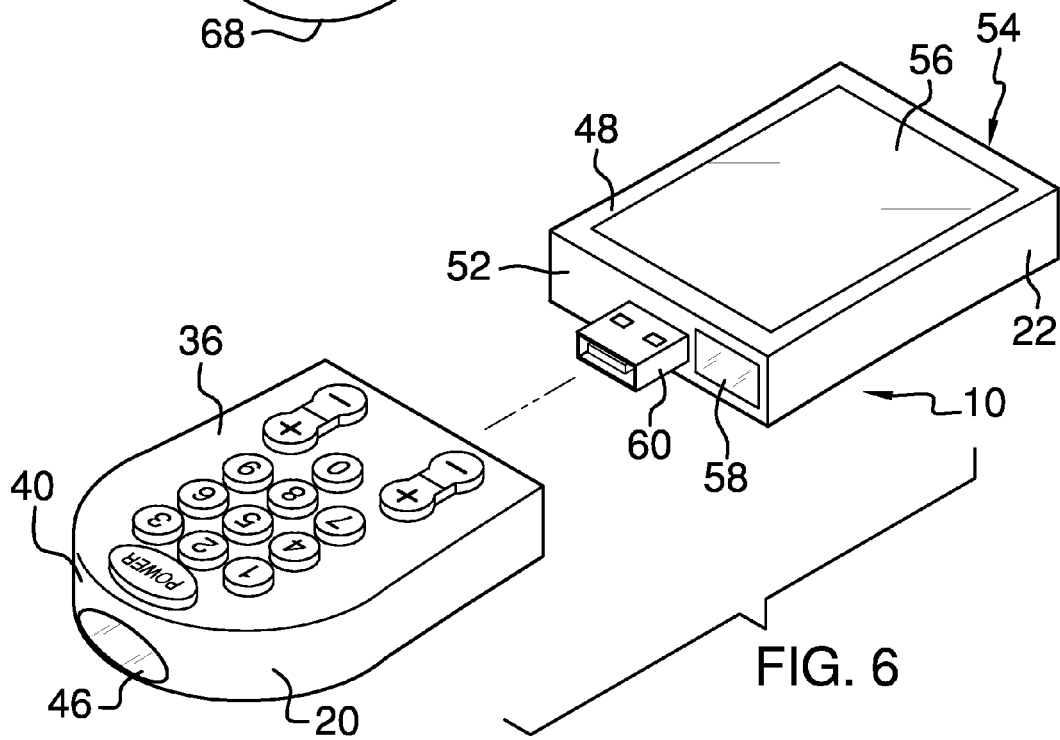
FIG. 6 is an exploded view.

The present modular remote with touchscreen 10 also includes a charging unit 76 (as shown in FIG. 4). This charging unit 76 includes a cradle 78, a contact piece 80, and a charging port 82. The contact piece 80 is configured to engage with a charging piece 84 disposed on the third member 24 posterior section 68. When the third member 24 is thusly placed into the charging unit 76 cradle 78, and releasably secured therein, the contact piece 80 engages with the charging piece 84 to recharge the device 10.

The charging port 82 releasably connects with alternately both of the first 60 and second 74 connectors, enabling the second member 22 to be charged separately from the third member 24. Thusly, the third member 24 may be connected to the first member 20 when charged to function separately from the second member 22 while the second member 22 is charging. Similarly, the second member 22 may be interconnected with both the first 20 and third 24 members, and the device 10 subsequently connected to the charging unit 76 to charge the device 10 en masse.

Each of the first 20, second 22, and third 24 members include a rechargeable battery (not shown) disposed in each of a first 86, second 88, and third 90 battery compartment. Each of these batteries may be recharged, or replaced, as desired.

What is claimed is:

1. A modular remote with touchscreen comprising:
   a first member having a keypad and a first sensor;
   a second member, operatively connectable with the first member, the second member having a touchscreen and a second sensor;
   a third member, operatively connectable with the first and second members, the third member having a plurality of buttons disposed thereon;
   wherein said first, second, and third members are operatively inter-connectable, the second member removable from between the first and third members;
   wherein the second member further comprises a top surface, a bottom surface, a front side, and a rear side, wherein the touchscreen display is disposed on the top surface and the front side releasably engages with the first member;
   wherein the touchscreen display includes a Graphic User Interface to operatively control each of a plurality of household devices; and
   wherein the second member further comprises a second connection port centrally disposed on the rear side.

2. The modular remote with touchscreen of claim 1 wherein the second connection port releasably engages with the second connector of the third member.

3. The modular remote with touchscreen of claim 2 wherein the first and second connectors interconnect with a separate charging unit to recharge the device as needed.

4. The modular remote with touchscreen of claim 2 wherein the third member further comprises a charging piece, which piece interconnects with the charging unit to recharge the device as needed.

5. The modular remote with touchscreen of claim 4 wherein the first member, second member, and third member each further comprise a rechargeable battery disposed within a battery compartment.

6. The modular remote with touchscreen of claim 5 wherein the plurality of buttons disposed on the third member includes a Play button, a Rewind button, a Fast Forward button, a Pause button, a Stop button, a Next Section button, a Previous Section button, and Enter button and a plurality of directional Arrow buttons.

\* \* \* \* \*